United States Patent [19]
Koneda et al.

[11] Patent Number: 5,829,135
[45] Date of Patent: Nov. 3, 1998

[54] METHOD OF JOINING A STATIONARY PULLEY AND SHAFT ASSEMBLY FOR A CONTINUOUSLY VARIABLE TRANSMISSION

[75] Inventors: Phillip Thomas Koneda, Novi; Stephen John Agdorny, Ypsilanti; Thomas Arthur McGinn, White Lake, all of Mich.

[73] Assignee: Ford Global Technologies, Inc., Dearborn, Mich.

[21] Appl. No.: 761,768

[22] Filed: Dec. 5, 1996

[51] Int. Cl.[6] ........................................ B21K 1/42
[52] U.S. Cl. .......................... 29/892.11; 29/525; 83/875
[58] Field of Search .................... 29/892, 892.1, 29/892.11, 525; 403/274, 281, 282; 474/8, 166, 903; 83/875

[56] References Cited

U.S. PATENT DOCUMENTS

| | | | |
|---|---|---|---|
| 4,509,381 | 4/1985 | Ikemoto et al. ...................... | 29/893.1 |
| 5,158,390 | 10/1992 | Ito et al. .................................. | 403/282 |
| 5,272,930 | 12/1993 | Nakamura et al. ..................... | 403/282 |
| 5,536,101 | 7/1996 | Schwarzler et al. .................... | 403/282 |

OTHER PUBLICATIONS

Ford 1995 Service Manual; Contour, Mystique; Aug. 1995, pp. 07–01–134 to 07–01–139.

*Primary Examiner*—P. W. Echols
*Attorney, Agent, or Firm*—Frank G. McKenzie

[57] ABSTRACT

A pulley shaft and stationary pulley assembly for a belt drive mechanism of a continuously variable transmission includes an inner surface of the pulley having metal-cutting serrations, a blocking shoulder, and a surface for engaging a pilot guide surface formed on the shaft. The shaft, formed of softer material than the hardened pulley, includes a shoulder adapted to have serrations formed in it during the assembly process, a hardened pilot guide, and a blocking shoulder adapted to contact the blocking shoulder of the pulley.

12 Claims, 2 Drawing Sheets

METHOD OF JOINING A STATIONARY PULLEY AND SHAFT ASSEMBLY FOR A CONTINUOUSLY VARIABLE TRANSMISSION

BACKGROUND OF THE INVENTION

1. Technical Field

This invention pertains to the field of belt drive assemblies for producing a variable speed ratio range in a continuously variable transmission for automotive vehicles.

2. Description of the Prior Art

The stationary pulley and pulley shaft of a variable speed ratio belt drive mechanism for a continuously variable transmission must maintain accurate radial, axial, and angular alignment mutually when loaded during operation. The stationary pulley must be able to carry both torsional and bending loads. High contact stresses on the pulley face are developed due to the clamping load required by the drive belt that engages the pulley assembly. The pulley shaft must be able to carry a combined loading that includes torsion, tension, and bending. In addition, portions of the shaft surface are subjected to a fretting environment due to repeated sliding displacement of a movable pulley on a close-fitting surface of the shaft.

In a continually variable transmission, a belt drive mechanism includes a stationary pulley that provides a face, inclined radially and axially, and adapted to driveably engage a belt having lateral surfaces matching those of adjacent pulley faces. In a conventional assembly, the stationary pulley is either machined integrally with its shaft, welded to the shaft, or connected to the shaft by a threaded connection. Adjacent the stationary pulley is an axially movable pulley, also having a face inclined radially and axially, and adapted to engage a lateral surface of the drive belt. The movable pulley is supported on the shaft for axial displacement toward and away from the stationary pulley; it is supported in this movement on a hardened surface formed locally on the outer surface of the shaft.

The manufacturing processes for producing a conventional belt drive mechanism of this type involves a high level of manufacturing complexity and cost. For example, in the case where the stationary pulley is formed integrally with the shaft, these components are made from a forging of high grade steel. Furthermore, the case hardness on the stationary pulley surface near the inner diameter is relatively shallow due to the effects of quenching the shaft material in a one-piece design. Additionally, the pulley shaft and stationary pulley in a conventional design are heat treated and hardened as a unit, even though the shaft and pulley have substantially different functional requirements for which separate heat treatment and hardening would be more appropriate.

SUMMARY OF THE INVENTION

It is a purpose of this invention to provide a belt drive mechanism that reduces manufacturing complexity, constraints, and costs, while increasing the robustness of a pulley/shaft assembly. This object is realized by constructing the pulley and shaft from two pieces.

Among the advantages of avoiding use of a conventional forging of high grade steel in the manufacture of a stationary pulley-shaft assembly and instead substituting the assembly method according to this invention is the ability to use various materials for the pulley and shaft. The material, hardenability, and strength requirements of the pulley are greater than those of the shaft. Therefore, a less expensive material can be chosen for the pulley shaft. A more uniform, deeper case hardness of the stationary pulley surface, near the inner diameter, results by removing the quenching effects of the shaft material inherent in the one-piece design. The pulley shaft and stationary pulley of this invention can be heat treated and hardened separately, using heat treat processes appropriate to their respective functional requirements. The components of the assembly are permanently aligned in a near-finished machined state.

In realizing these advantages and objects, a method for forming a belt drive mechanism for a continuously variable transmission, according to this invention, includes the steps of: machining a shaft having a shoulder, a first radially directed blocking surface located at an axial end of said shoulder, a pilot surface radially smaller than the shoulder, extending axially and located axially opposite the first surface from the location of the shoulder; and forming a pulley having a first surface adapted to produce an interference fit with the pilot surface, a radially inner surface having cutting serrations adapted to form and to engage driveably complementary serrations formed in the shoulder as the pulley moves axially over the pilot surface, a second blocking shoulder directed radially and located for contact with the first blocking shoulder.

Thereafter the shaft and pulley are assembled as the pulley slides over the shaft so that the cutting serrations are directed toward the shoulder. The pulley and shaft are forced together so that the first surface slides over the pilot surface, the cutting serrations enter and pass through the shoulder, and the first blocking surface contacts the second blocking surface.

DESCRIPTION OF THE PREFERRED EMBODIMENT

Figure 1:
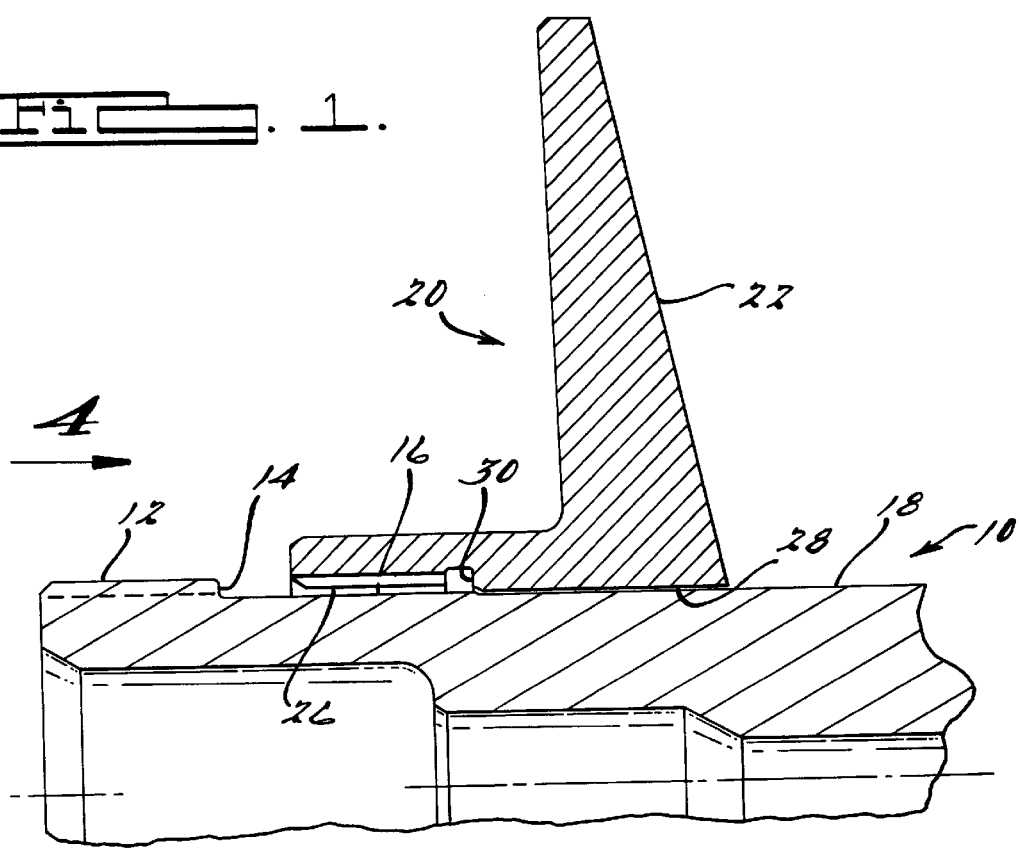
FIG. 1 is a cross section of a pulley shaft and stationary pulley located on the shaft during the process of assembly.
Figure 2:
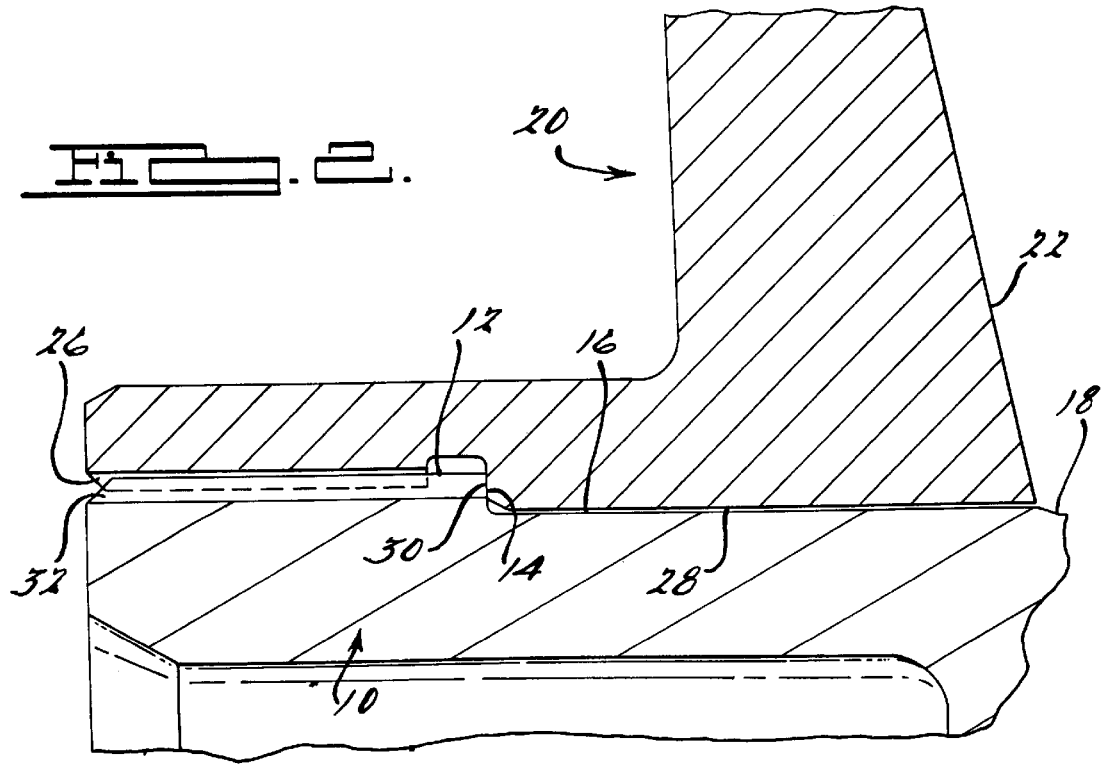
FIG. 2 is a cross section showing a detail of the assembly according to this invention.
Figure 3:
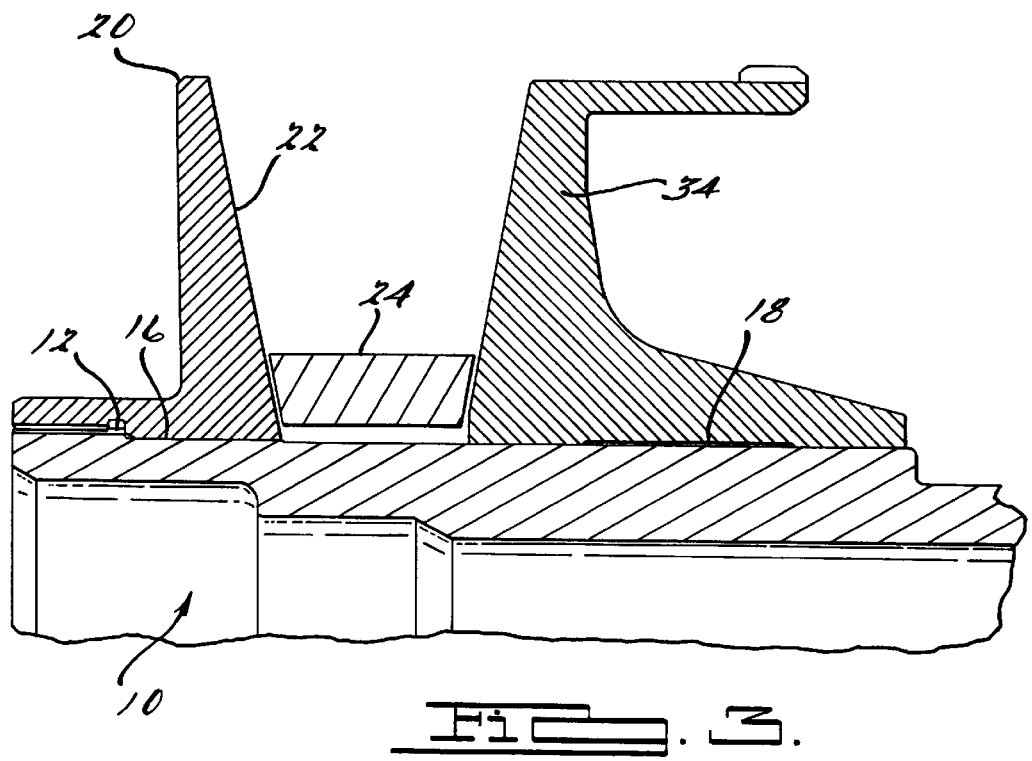
FIG. 3 is a cross section of an assembly that includes a shaft, stationary pulley, and movable pulley.
Figure 4:
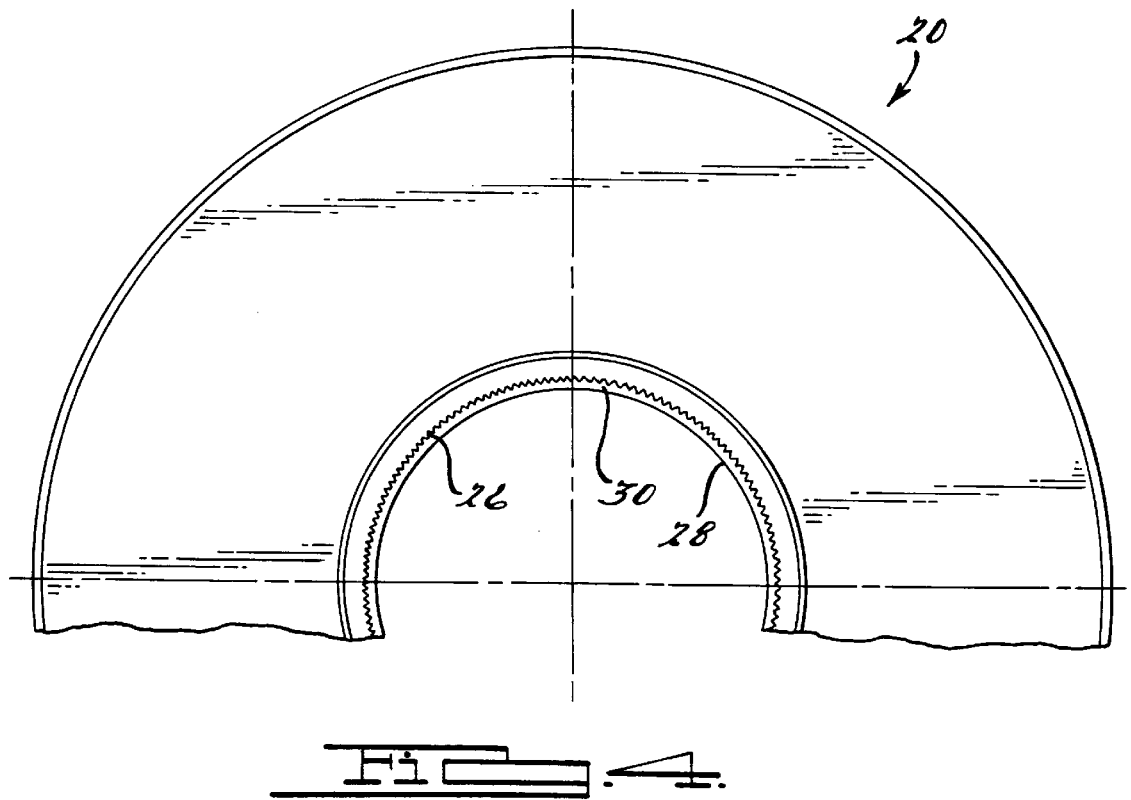
FIG. 4 is an end view of a pulley taken in the direction of arrow 4 in FIG. 1 showing the form of the cutting serrations.

A pulley shaft 10 is formed with a shoulder, illustrated in the form of a right circular cylinder, located near or substantially close to an axial end of the shaft. Shaft 10 further includes, at the axially opposite end of shoulder 12, a first radially—in either tube or bar stock directed blocking surface 14. A surface 16, illustrated in the form of a right circular cylinder, extends axially along a portion of the outer surface of the shaft and provides an interference fit with a surface of a pulley. Surface 16 is a serration cutting pilot surface, as will be explained below. The shaft also provides a movable pulley journal surface 18.

The pulley shaft is machined from either tube or bar stock with all features to finished dimensions, except for sliding fit journal surface 18 and all bearing journals. These two surfaces are rough machined initially and left with enough stock to finish machine to their final dimensions after being induction hardened.

Preferably, the shaft is formed of surface-induction hardenable steel such as SAE 1035 to 1050 plain medium carbon steel. Splines and all journal bearing surfaces, such as external journal surface 18 that supports the movable pulley for sliding movement, are induction hardened to a surface hardness of Rc 56. Shoulder 12 is hardened to about Rc 24.

A stationary pulley 20 is formed with a face 22, adapted to driveably engage a lateral surface of a drive belt 24. Before the pulley is forced into contact with the pulley shaft during the assembly process, cutting serrations 26 are formed on an inner surface extending along the axis of the pulley from the axial end of the pulley that faces surface 14. Pulley 20 also includes an inner surface 28 sized to produce an interference fit with serration cutting pilot surface 16 and to slide freely over movable pulley journal surface 18.

Preferably, pulley 20 is forged of SAE 4320 steel, bearing steel, or another steel alloy able to be carburized and to provide a surface hardness of Rc 60 and a minimum case depth of about 1.0 mm.

The forging, formed with dimensions approximating finished dimensions and net shape, is machined before heat treating. The internal cutting serrations 26 are finish machined so that the serrations have a 45 degree pressure angle and a chamfered tooth leading cutting edge. Then all other features of pulley 20 are finish machined except for the internal interference fit surface 28 and face 22. Surface 28 and face 22 are rough machined having only enough stock for finish machining after heat treatment. This procedure ensures dimensional and surface finish requirements.

Thereafter, pulley 20 is carburized and heat treated to achieve the 1.0 mm case depth on the pulley face 22. After heat treatment, surface 28 is finish machined and the pulley is then ready for assembly to shaft 10.

After the shaft 10 and pulley 20 are formed and processed, the pulley slides leftward over journal surface 18 of the shaft, as shown in FIG. 1, until surfaces 16 and 28 are brought into contact. This contact establishes a pilot surface for guiding leftward movement of the pulley over the shaft while the self-cutting serrations are being formed.

Using a press, the pulley is forced over the shaft using the interference fit of surfaces 16, 28 to guide this movement while the serrations 26 on the pulley cut a shape complementary to that of their exterior surface into shoulder 12. Chips of shaft metal cut from shoulder 12 fall away from the assembly. The pulley surface 28 moves along the shaft pilot surface 16 until blocking surfaces 14, 30 are in mutual contact. In this position, the serrations 32 formed during the pressing operation are driveably engaged with serrations 26, and surfaces 16, 28 are engaged with an interference fit.

Then, the assembly is finish machined by either grinding or hard turning to obtain the proper surface finish and concentricity tolerances of the pulley face 22, sliding journal surface 18 that supports the movable pulley 34, and all bearing journal diameters.

This method of forming and assembling the shaft and pulley eliminates the large stress concentration present in conventional assemblies where the radially inner base of the stationary pulley face meets the outer surface of the shaft.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A method for forming a belt drive mechanism for a continuously variable transmission, comprising the steps of:
   machining a shaft having a shoulder, a first radially directed blocking surface located at an axial end of said shoulder, a pilot surface radially smaller than the shoulder, extending axially and located axially opposite the first surface from the location of the shoulder;
   forming a pulley having a first surface adapted to produce an interference fit with said pilot surface, a radially inner surface formed with cutting serrations adapted to form complementary serrations in the shoulder and to engage driveably the complementary serrations in the shoulder as the pulley moves axially over the pilot surface, a second blocking shoulder directed radially and located for contact with the first blocking shoulder; and
   forcing the first surface over the pilot surface so that the cutting serrations enter and pass through the shoulder.

2. The method of claim 1, further comprising:
   machining in the pulley a face inclined radially outward and axially toward the shoulder; and
   hardening the material of the cutting serrations and producing a predetermined case hardness depth in the face by heat treating the pulley.

3. The method of claim 2, further comprising:
   finish machining the pulley face and said first surface to final dimensions.

4. The method of claim 2, further comprising:
   finish grinding the pulley face and said first surface to final dimensions.

5. The method of claim 2, further comprising:
   finish grinding the pulley face and said first surface to final dimensions; and
   finish grinding the journal surface and pilot surface to final dimensions.

6. The method of claim 5, further comprising:
   sliding the pulley over the shaft so that the cutting serrations are directed toward the shoulder and the pilot surface and first surface are in contact; and
   forcing the first surface over the pilot surface until the first blocking surface contacts the second blocking surface.

7. The method of claim 1, further comprising:
   machining on the shaft an axially extending journal surface adapted to support a movable pulley thereon with a sliding fit;
   hardening the material of the journal surface by locally heat treating the shaft in the area of the journal surface; and
   finish machining the journal surface and pilot surface to final dimensions.

8. The method of claim 1, further comprising:
   machining on the shaft an axially extending journal surface adapted to support a movable pulley thereon with a sliding fit; and
   hardening the material of the journal surface by locally heat treating the shaft in the area of the journal surface; and
   finish grinding the journal surface and pilot surface to final dimensions.

9. The method of claim 1, further comprising:
   sliding the pulley over the shaft so that the cutting serrations are directed toward the shoulder and the pilot surface and first surface are in contact; and forcing the first surface over the pilot surface until the first blocking surface contacts the second blocking surface.

10. A method for forming a belt drive mechanism for a continuously variable transmission, comprising the steps of:

machining a shaft having a shoulder, a first radially directed blocking surface located at an axial end of said shoulder, a pilot surface radially smaller than the shoulder, extending axially and located axially opposite the first surface from the location of the shoulder, and an axially extending journal surface adapted to support a movable pulley thereon with a sliding fit; and forming a pulley having a first surface adapted to produce an interference fit with said pilot surface, a radially inner surface formed with cutting serrations adapted to form in the shoulder and to engage driveably the complementary serrations in the shoulder as the pulley moves axially over the pilot surface, a second blocking shoulder directed radially and located for contact with the first blocking shoulder, and a face inclined radially outward and axially toward the shoulder; and forcing the first surface over the pilot surface so that the cutting serrations enter and pass through the shoulder.

11. The method of claim 10, further comprising:

hardening the material of the cutting serrations and producing a predetermined case hardness depth in the face by heat treating the pulley;

finish machining the pulley face and said first surface to final dimensions;

hardening the material of the journal surface by locally heat treating the shaft in the area of the journal surface; and finish machining the journal surface and pilot surface to final dimensions.

12. The method of claim 11, further comprising:

sliding the pulley over the shaft so that the cutting serrations are directed toward the shoulder and the pilot surface and first surface are in contact; and forcing the first surface over the pilot surface until the first blocking surface contacts the second blocking surface.

* * * * *